United States Patent
Wasko

(10) Patent No.: US 7,079,846 B2
(45) Date of Patent: Jul. 18, 2006

(54) CONTROL OF NETWORK ELEMENT SUPPORTING VARIABLE TRANSMISSION MODES

(75) Inventor: Stephen Wasko, Hampshire (GB)

(73) Assignee: Nokia Corporation, Espoo (FI)

( * ) Notice: Subject to any disclaimer, the term of this patent is extended or adjusted under 35 U.S.C. 154(b) by 249 days.

(21) Appl. No.: 10/227,737

(22) Filed: Aug. 26, 2002

(65) Prior Publication Data
US 2003/0050073 A1    Mar. 13, 2003

(30) Foreign Application Priority Data
Aug. 31, 2001    (GB) .................................. 0121193.7

(51) Int. Cl.
*H04Q 7/20* (2006.01)
(52) U.S. Cl. .................. 455/452.1; 455/450; 455/509; 455/466; 455/414.1; 455/414.4; 455/422.1; 455/426.1; 370/480
(58) Field of Classification Search ............... 455/403, 455/414.1, 414.4, 422.1, 426.1, 426.2, 450–453, 455/550.1, 466, 458, 500, 517, 15; 370/552.1, 370/555, 295, 468, 480
See application file for complete search history.

(56) References Cited

U.S. PATENT DOCUMENTS

| | | | | |
|---|---|---|---|---|
| 5,590,405 A | * | 12/1996 | Daly et al. ................... | 455/504 |
| 6,122,504 A | * | 9/2000 | Niepel et al. ............ | 455/422.1 |
| 6,188,898 B1 | | 2/2001 | Phillips ...................... | 455/433 |
| 6,388,999 B1 | * | 5/2002 | Gorsuch et al. ............ | 370/335 |
| 6,424,636 B1 | * | 7/2002 | Seazholtz et al. ........... | 370/295 |
| 2003/0194972 A1 | * | 10/2003 | Harada et al. ................ | 455/69 |

FOREIGN PATENT DOCUMENTS

| | | |
|---|---|---|
| EP | 0 852 448 A1 | 7/1998 |
| WO | WO 99/39528 | 8/1999 |

OTHER PUBLICATIONS

Sirius Communications; "Sirius Announces World's First Software-Configurable W-CDMA Core for Third-Generation Wireless Handsets and Base Stations"; Sirius Website; Jun. 14, 1999: XP002151828.

* cited by examiner

*Primary Examiner*—Keith Ferguson
(74) *Attorney, Agent, or Firm*—Squire, Sanders & Dempsey LLP

(57) ABSTRACT

There is disclosed a network in which there is provided a method of controlling a network element having variable transmission modes, comprising: defining the available transmission modes in the network; and storing the defined transmission modes in a network element, wherein the transmission modes of the network element are determined in dependence on the stored available transmission modes.

19 Claims, 2 Drawing Sheets

CONTROL OF NETWORK ELEMENT SUPPORTING VARIABLE TRANSMISSION MODES

FIELD OF THE INVENTION

The present invention relates to networks in which a finite amount of transmission modes are available for use across the network, and in which network at least some network elements have variable transmission modes. The invention is particularly, but not exclusively, concerned with wireless networks in which the available network transmission modes are limited by the constraints of a licence in a network.

BACKGROUND TO THE INVENTION

In traditional cellular networks, the number of radio resources is controlled by the physical limitations of the hardware. That is, for example, a network must be configured solely as a GSM network or a WCDMA network.

With the advent of software defined radios (SDRs) the maximum number of transmission modes that can be supported by a single hardware element increases significantly. In this context, transmission modes refers to either radio resources or modes of operation (operational modes). Radio resources refer to, for example, the number of carriers (i.e. frequencies) supported or the number of frequency bands supported. A mode of operation refers to, for example, GSM or WCDMA, i.e. a radio standard.

A problem arises since some new network feature, such as automatic channel selection (ACS), may attempt to use as many radio resources as is supported, by the software defined hardware, even if this is not optimum for the network.

A further possible problem arises in that the use of software definable radio potentially enables network operators to use hardware for more extensive network support than was envisaged at the time the network equipment was sold. Thus the equipment manufacturer may be unable to limit the number of radio resources or modes of operation that can be exploited by an operator.

It is an aim of the present invention to provide a technique for overcoming the above discussed problems.

SUMMARY OF THE INVENTION

According to a first aspect of the present invention ther eis provided a method of controlling a network element having variable transmission modes, comprising: defining the available transmission modes in the network; and storing the defined transmission modes in a network element, wherein the transmission modes of the network element are determined in dependence on the stored available transmission modes.

The transmission modes may include either available radio resources or available operational modes. The available radio resources may include an available number of carrier frequencies or an available number of frequency bands. The available operational modes may be radio standards. The available radio standards may include GSM or WCDMA.

A transmission mode of the network element may be varied responsive to a request for a specific transmission mode from the network element, provided the transmission mode is a determined transmission mode for the network. Varying of a transmission mode of the network element may include a software reconfiguration of the network element. Varying of a transmission mode of the network element may include a hardware reconfiguration of the network element. The step of defining the transmission modes in the network may further include the step of defining network elements with which they are associated. The transmission modes of the network element may be determined under the control of a network resource controller. The transmission modes of the network may be stored in a network element for controlling radio resource management. The transmission modes of the network may be stored in a plurality of network elements, each of the plurality of network elements for controlling radio resource management in the network. The transmission modes of the network may be stored in the network element having variable transmission modes. There may be provided a plurality of such modes, the distribution of the transmission modes being controlled by a radio resource management function. The storage of the determined transmission modes may be distributed across the network. Said network element is preferably a wireless software definable radio modem.

In a further aspect the present invention provides a method of controlling a software definable radio modem in a wireless network, comprising: defining the available radio resources and operational modes available in the network; and storing such in a network element, wherein the transmission modes of the software definable radio are determined in dependence on the stored information, and wherein the radio resource or operational mode of the modem is varied responsive to a request from the modem in dependence on the requested transmission mode being available, as defined by the stored information. The transmission mode of the modem is preferably varied by a reconfiguration of software within the modem. The transmission mode of the modem is preferably varied by a reconfiguration of hardware within the modem.

The available transmission modes are preferably determined in dependence on a granted licence.

The network resource controller may store certain transmission modes available to the network element. The network resource controller may receive a request from the network element for a new transmission mode. The transmission modes of the network may be determined by a transmission mode controller. The transmission mode controller may store transmission modes available to the network. The transmission mode controller may receive a request from the network resource controller for a new transmission mode for a network element. The available transmission modes in the network may be updated responsive to a request from the network element.

In another aspect, the present invention provides a network comprising: a network element having a variable transmission mode; a network resource controller for controlling the transmission modes of the network element; and a transmission mode controller for defining the transmission modes available for use in the network.

The variable transmission modes may be radio resources and/or operational modes. The radio resources may include a variable number of radio carriers and/or a variable number of frequency bands and the operational modes are variable radio resources include variable transmission standards. The network element may be a software definable radio modem.

The transmission mode controller may include a storage element for storing the transmission modes.

BRIEF DESCRIPTION OF THE FIGURES

The invention will now be described by way of example with regard to the accompanying drawings, in which.

DESCRIPTION OF PREFERRED EMBODIMENTS

The invention will now be described by way of example with reference to a particular, non-limiting example.

Figure 1:
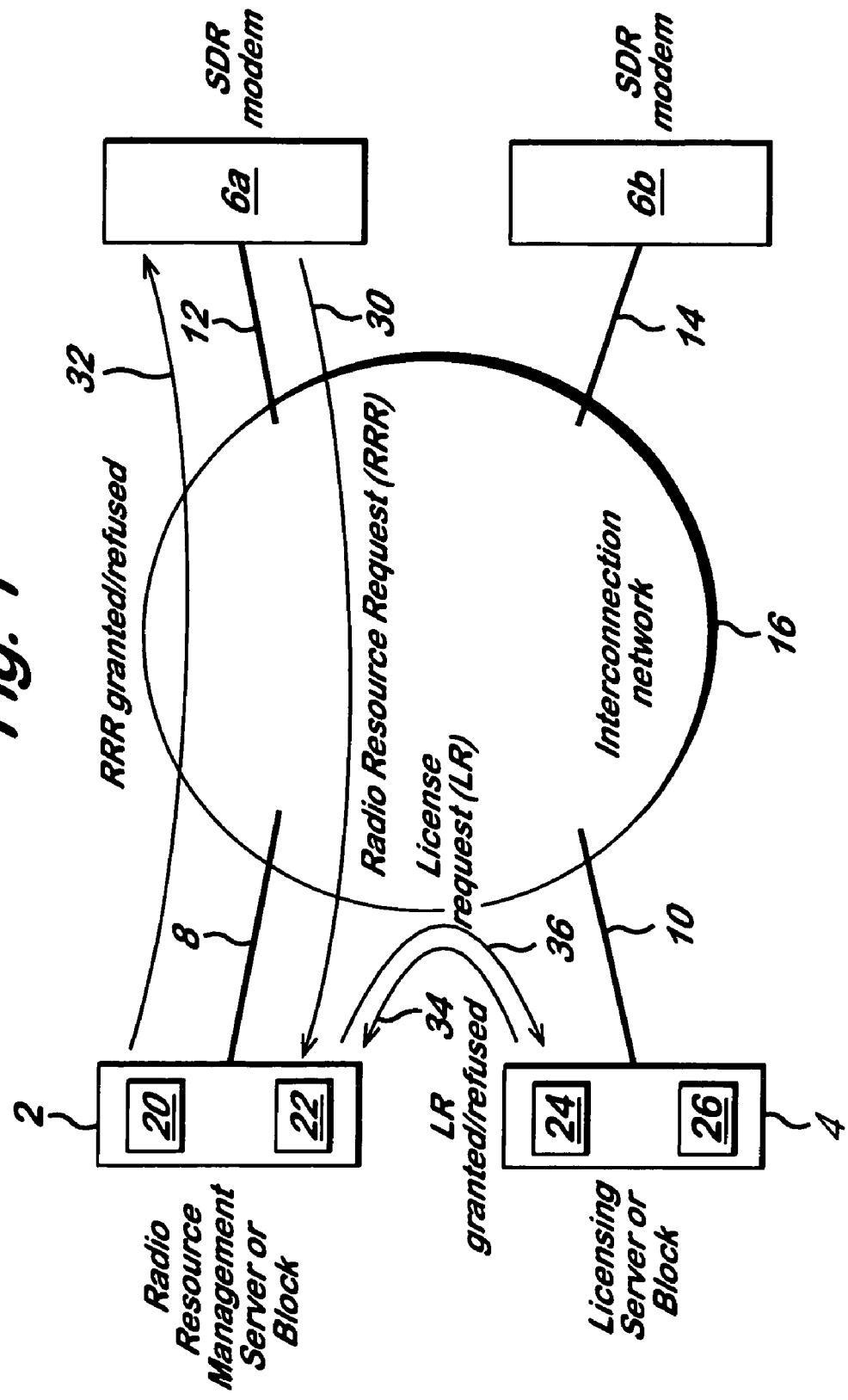
FIG. 1 illustrates the functional blocks of a wireless network for implementing a preferred embodiment of the present invention.

Referring to FIG. 1, in the illustrated embodiment a radio network includes the following logical blocks: a radio resource management block or server 2, a licensing block or server 4, and two software defined radio (SDR) modems 6a and 6b.

Any of the logical blocks shown in FIG. 1 may be co-located or integrated within a single physical network element, or the blocks may be distributed across the physical network elements. The location of the logical blocks in the network is not important to the operation of the present invention. An example of the possible distribution of the functional elements associated with the invention is presented further hereinbelow.

In the illustrative example of FIG. 1, the various logical blocks are shown as separate physical entities having respective connections 8, 10, 12 and 14 to an interconnection network 16. The actual construction of the interconnection network will be dependent upon the physical location of the logical blocks. The interconnections preferably use the standard connections between the various physical elements of a network.

Although the logical block 4 is identified as a licensing block or server, it will be understood from the following description that the block in fact controls and stores information concerning the transmission modes which may be used by the various elements of the network. In practice, when an operator purchases a network, licences for a fixed number of radio resources and operational modes are also purchased. Therefore the licence determines the transmission modes of the network. As discussed in the introduction hereinabove, in the context of the present invention the term transmission mode refers to the possible radio resources and operational modes available in the network.

In accordance with the present invention, such licences may be supplied as part of the software or hardware of the network. Thus, the network functionality provided by the license may be encoded into the network or otherwise provided in the network. This information may be supplied with the licensing server 4, or may be supplied separately.

In accordance with the present invention, the number of transmission modes, i.e. radio resources or operating modes, supported by the network cannot exceed the total number defined by the licences controlled by the licensing server. In the described embodiment, the licensing server stores the details of the transmission modes purchased by the network operator. Thus, there will be stored in the licensing server details of the operational modes and/or radio resources available in the network. The licensing server also preferably stores an indication of which of these transmission modes are currently in use, and therefore which are available for use.

The network may include more than one radio resource management block 2. Each SDR modem 6 of the network will be associated with, and connected to, a radio resource management block. Whilst the network performance permitted by the operator's license is stored in the licensing server 4, in a preferred embodiment the available resources are shared amongst the network resources. Thus, for example, in a network having n radio resource management blocks, each block may be allocated 1/n of the available transmission modes in the network. In further alternative arrangements, the available transmission modes may be distributed on an unequal basis in accordance with traffic volumes in particular cells, for example.

In the preferred embodiment of FIG. 1, when a SDR modem, for example modem 6a, has a need to support more radio resources or change operational modes, a request is made to its associated radio resource management block 2. If the radio resource management block 2 determines that the requested transmission modes is available within its allocated parameters, then the SDR modem 2a is notified of such and the transmission mode of the modem is varied accordingly. If, however, the radio resource management block determines that it does not have any such modes available, then the request is forwarded to the licensing server. If the licensing server determines that the network allocation of transmission modes is not being fully used, then the parameter is allocated to the SDR modem 6a. In one embodiment the licensing server may allocate the transmission modes from another radio resource management block.

In one embodiment the radio resource management block 2 includes a controller 20 and a storage element 2 for storing the transmission modes of the network which have been allocated to it. Similarly, the licensing block may include a controller 24 and a storage element 26 for storing the network transmission modes.

Whenever the transmission modes of a network element such as modem 6a is altered, an appropriate update is made to the information stored in the licensing block 4.

Where a network operator purchases an upgraded licence, the equipment provider can make the necessary updates to the transmission modes in the licensing block.

Figure 2:
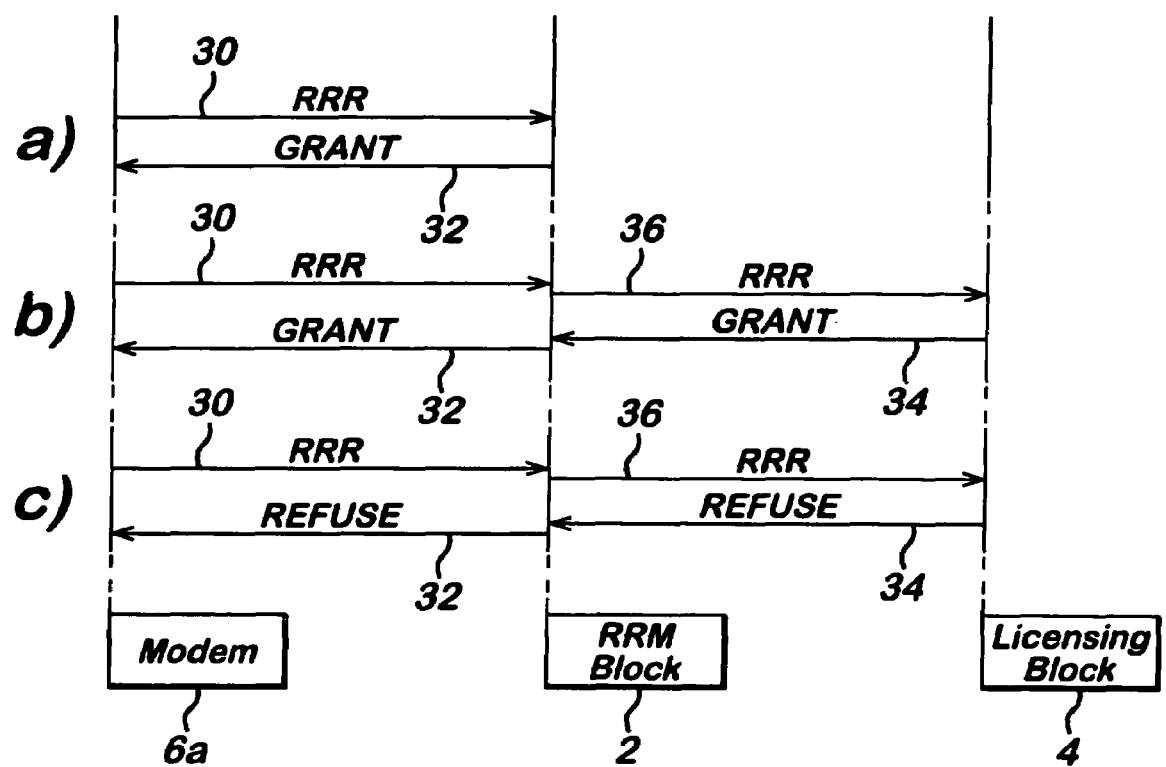
FIG. 2 illustrates three implementation scenarios of the preferred embodiment of FIG. 1.

The invention will now be further described by way of example with reference to FIG. 2.

In a first example, illustrated in FIG. 2(a), the SDR modem 6a has a need to support more radio channels, and issues a radio resource request (RRR) to the radio resource management block 2 as represented by arrow 30. In this example the radio resource management block 2 has spare transmission modes (which can be considered to be spare network capacity under the network licence) and grants the request as indicated by arrow 32. The modem 6a then adapts to support more radio channels.

In a second example, illustrated in FIG. 2(b), the SDR modem 6a again has a need to support more radio channels, and issues a radio resource request (RRR) to the radio resource management block 2 as represented by arrow 30. In this example the radio resource management block 2 has no extra transmission modes, and forwards the request to the licensing block 4 as a licence request (LR) as represented by arrow 36. The licensing server has spare transmission modes under the network licence, and grants the radio resource request as represented by arrow 34. The resource management block then forwards the grant to the modem as shown by arrow 32. The modem 6a then adapts to support more radio channels.

In a third example, illustrated in FIG. 2(c), the SDR modem 6a again has a need to support more radio channels, and issues a radio resource request (RRR) to the radio resource management block 2 as represented by arrow 30. In this example the radio resource management block 2 has no extra transmission modes, and forwards the request to the licensing block 4 as a licence request (LR) as represented by arrow 36. In this example the licensing server has no spare transmission modes under the network licence, and refuses the radio resource request as represented by arrow 34. The resource management block then forwards the refusal to the modem as shown by arrow 32. The modem 6*a* then cannot adapt to support more radio channels.

In the examples described hereinabove, a basic implementation is described in which separate hardware acts as the SDR modem, the radio resource management block, and the licensing block. Other possible implementations include:

1. The licensing block may be centralised in the cellular network and store all the network licence information, and with the radio resource management block integrated therein.
2. The licence information may be distributed amongst the radio resource management blocks in the network, and the radio resource management blocks may negotiate the distribution of licenses and act as license blocks or servers.
3. The license information may be distributed among SDR elements within the network, and the radio resource management blocks may negotiate the re-distribution of licenses between the SDR elements and act as licence blocks or servers.
4. The licensing servers may be distributed within the cellular network and can negotiate the re-distribution of licenses, and the radio resource management block may be centralised or distributed and can negotiate with any license block or server.
5. The SDR modems may negotiate the use of license and thus radio resources directly, so that the radio resource management and licensing blocks are fully distributed to and integrate with each SDR modem.

Thus, the present invention provides an advantageous technique in which an equipment manufacturer is able to limit the number of radio resources or operational modes that can be exploited by an operator, and is able to charge more when the hardware supports more radio resources or operational modes. An equipment manufacturer is also better able to protect its business when an operator purchases SDR hardware, for example as a replacement for broken hardware, by limiting the capabilities of such hardware.

The change which occurs in the SDR modem as a result of a granted radio resource request will depend upon the structure of the modem. If the hardware in the modem is multi-functional, then the change in the modem may be provided by a change or reconfiguration in the software operating in the modem. If the hardware in the modem is not multi-functional, then the change in the modem may be provided by a physical reconfiguration of hardware within the modem, e.g. by switching from one hardware configuration to another.

In a further embodiment the invention allows a transmission mode to be changed either permanently or temporarily. A permanent change may be as the result of the network operator acquiring additional transmission mode capacity by purchasing a new or enhanced licence. In dependence on whether the change is permanent or temporary, the transmission modes are stored in the appropriate network element either permanently or temporarily.

Whilst the present invention has been described hereinabove with reference to specific illustrative examples, it is not limited by such examples. The invention may be utilised in any network environment, and is not limited to a wireless network. In particular, although the invention has been described herein with reference to a wireless network supporting GSM and WCDMA, the invention is not limited to such an example which are discussed herein merely as examples of two radio standards. The invention applies to any network element for which transmission modes may be varied, and is not limited to SDR modems. The invention is not limited to a network environment in which distinct radio resource management and licensing logical blocks are provided. The functionality achieved by such logical blocks as described herein may be achieved in a number of ways in various network elements. The important aspect of their functionality is that there is provided in the network an indication of the transmission modes available for use by the network, which information is accessible by a resource controller associated with the network element having variable transmission modes.

Thus, the invention set out herein is not limited in scope by the above-described illustrative examples. One skilled in the art will appreciate how the teachings disclosed herein may be adapted to utilise the invention more generally, without departing from the scope of the invention as defined by the appended claims.

The invention claimed is:

1. A method of controlling a network element having variable transmission modes, comprising the steps of:
   determining in a network element whether the network element requires more transmission modes;
   transmitting a request from the network element to a network resource controller for a requested transmission mode based on a result of the step of determining in the network element whether the network element requires more transmission modes;
   determining in the network resource controller whether the requested transmission mode is available at the network resource controller;
   further transmitting a request from the network resource controller to a transmission mode controller when the network resource controller determines that the requested transmission mode is not available at the network resource controller;
   defining the available transmission modes in the network;
   storing the defined transmission modes in the transmission mode controller;
   determining in the transmission mode controller whether the requested transmission mode is available;
   granting from the transmission mode controller to the network resource controller the requested transmission mode based on the step of determining in the transmission mode controller that the requested transmission mode is available; and
   further granting from the network resource controller to the network element the requested transmission mode, wherein the available transmission modes include either available radio resources or radio standards.
2. A method according to claim 1 wherein the available radio resources include an available number of carrier frequencies or an available number of frequency bands.
3. A method according to claim 1 wherein the available radio standards include GSM or WCDMA.
4. A method according to claim 1 wherein granting the requested transmission mode of the network element includes a software reconfiguration of the network element.

5. A method according to claim 1 wherein granting the requested transmission mode of the network element includes a hardware reconfiguration of the network element.

6. A method according to claim 1 wherein the step of defining the transmission modes in the network further includes the step of defining network elements with which the transmission modes associated.

7. A method according to claim 1 wherein the transmission modes of the network are stored in the network resource controller.

8. A method according to claim 1 wherein the transmission modes of the network are stored in a plurality of network resource controllers.

9. A method according to claim 1 wherein the available transmission modes of the network are stored in the network element.

10. A method according to claim 1 wherein the storage of the available transmission modes is distributed across the network.

11. A method according to claim 1 wherein the network element is a wireless software definable radio modem.

12. A network comprising:
 a network element having a variable transmission mode;
 a network resource controller for controlling the transmission modes of the network element; and
 a transmission mode controller for defining the transmission modes available for use in the network,
 wherein the network element is configured to determine whether the network element requires more transmission modes and request from the network resource controller available transmission modes;
 wherein the network element controller is configured to determine whether the requested transmission mode is available at the network resource controller and request the transmission mode from the transmission mode controller when the requested transmission mode is not available at the network resource controller;
 wherein the transmission mode controller is configured to determine whether the requested transmission mode is available for use in the network, and grant the requested transmission mode to the network resource controller, the network resource controller further configured to grant the requested transmission mode to the network element; and
 wherein the variable transmission modes are radio resources and/or transmission standards.

13. A network according to claim 12 wherein the radio resources include a variable number of radio carriers and/or a variable number of frequency bands.

14. A network according to claim 12 wherein the network element is a software definable radio modem.

15. A network according to claim 12 wherein the transmission mode controller includes a storage element for storing the transmission modes.

16. A method of controlling a software definable radio modem in a wireless network, comprising the steps of:
 determining in the software definable radio modem whether the network element requires more transmission modes;
 transmitting a request from the software definable radio modem to a network resource controller for a requested transmission mode based on a result of the step of determining in the software definable radio modem whether the network element requires more transmission modes;
 determining in the network resource controller whether the requested transmission mode is available at the network resource controller;
 further transmitting a request from the network resource controller to a transmission mode controller when the network resource controller determines that the requested transmission mode is not available at the network resource controller;
 defining the available transmission modes available in the network;
 storing the defined transmission modes in a transmission mode controller;
 determining in the transmission mode controller whether the requested transmission mode is available;
 granting from the transmission mode controller to the network resource controller the requested transmission mode based on the step of determining in the transmission mode controller that the requested transmission mode is available; and
 further granting from the network resource controller to the software definable radio modem the requested transmission mode, wherein transmission modes of the modem are varied responsive to the granting of the requested transmission mode from the network resource controller.

17. A method according to claim 16 wherein the transmission modes of the modem are varied by a reconfiguration of software within the modem.

18. A method according to claim 16 wherein the transmission modes of the modem are varied by a reconfiguration of hardware within the modem.

19. A method according to claim 16 wherein the available transmission modes are determined in dependence on a granted license.

* * * * *